United States Patent
Niewiadomski et al.

(10) Patent No.: US 11,491,833 B2
(45) Date of Patent: Nov. 8, 2022

(54) SYSTEM AND METHODS FOR VEHICLE ALIGNMENT CONTROL

(71) Applicant: Ford Global Technologies, LLC, Dearborn, MI (US)

(72) Inventors: Luke Niewiadomski, Dearborn, MI (US); Li Xu, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 622 days.

(21) Appl. No.: 16/260,522

(22) Filed: Jan. 29, 2019

(65) Prior Publication Data
US 2020/0238771 A1 Jul. 30, 2020

(51) Int. Cl.
*B60D 1/36* (2006.01)
*B60W 10/18* (2012.01)
*B60W 10/20* (2006.01)
*B60D 1/06* (2006.01)

(52) U.S. Cl.
CPC .............. *B60D 1/366* (2013.01); *B60W 10/18* (2013.01); *B60W 10/20* (2013.01); *B60D 1/065* (2013.01); *B60W 2520/10* (2013.01); *B60W 2754/30* (2020.02)

(58) Field of Classification Search
CPC ....... B60D 1/366; B60D 1/065; B60W 10/20; B60W 10/18; B60W 2754/30; B60W 2520/10
See application file for complete search history.

(56) References Cited

U.S. PATENT DOCUMENTS

| | | | |
|---|---|---|---|
| 6,970,184 B2 | 11/2005 | Hirama et al. | |
| 8,350,684 B2 | 1/2013 | McClure | |
| 8,665,078 B2 | 3/2014 | Van Wiemeersch et al. | |
| 9,102,271 B2 | 8/2015 | Trombley et al. | |
| 9,315,175 B1* | 4/2016 | Reed | B60T 8/171 |
| 9,499,018 B2 | 11/2016 | Gehrke et al. | |
| 9,914,333 B2 | 3/2018 | Shank et al. | |
| 2005/0017855 A1* | 1/2005 | Harvey | G08G 1/207 340/426.1 |
| 2008/0054598 A1* | 3/2008 | Weber | B60D 1/665 280/475 |
| 2013/0226390 A1* | 8/2013 | Luo | B60D 1/36 348/148 |
| 2015/0066328 A1* | 3/2015 | Nakada | B62B 9/02 701/93 |
| 2017/0151846 A1* | 6/2017 | Wuergler | B62D 15/029 |
| 2018/0253106 A1* | 9/2018 | Inui | B60D 1/06 |
| 2018/0312022 A1 | 11/2018 | Mattern et al. | |
| 2019/0299947 A1* | 10/2019 | Higashitani | B60T 8/1708 |
| 2019/0339704 A1* | 11/2019 | Yu | G06T 7/174 |
| 2020/0039517 A1* | 2/2020 | Berkemeier | G05D 1/0231 |

* cited by examiner

*Primary Examiner* — Jelani A Smith
*Assistant Examiner* — Toya Pettiegrew
(74) *Attorney, Agent, or Firm* — Gregory Brown; Price Heneveld LLP

(57) ABSTRACT

A vehicle system configured to control a trailer alignment routine comprises a hitch mounted on a vehicle and a controller. The controller is configured to identify a coupler position of a trailer and control motion of the vehicle toward an aligned position. The controller is further configured to calculate a stopping threshold relative to the coupler position. The stopping threshold comprises a semicircle concentric to the coupler position. The controller is further configured to control a braking procedure in response to the hitch passing the stopping threshold.

16 Claims, 7 Drawing Sheets

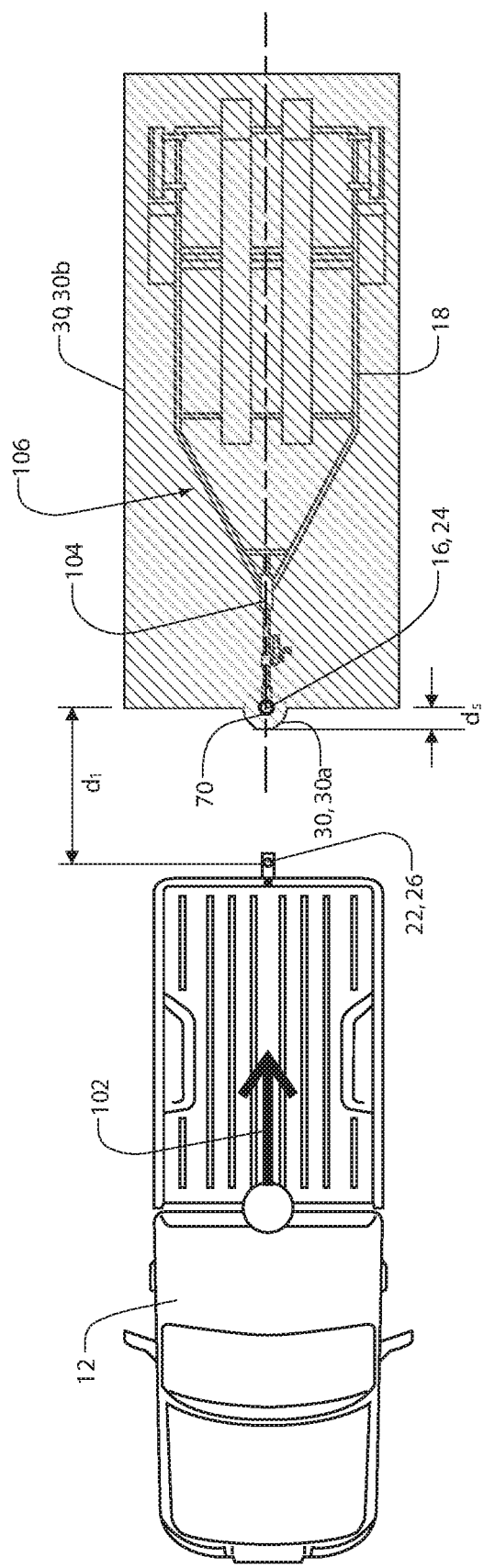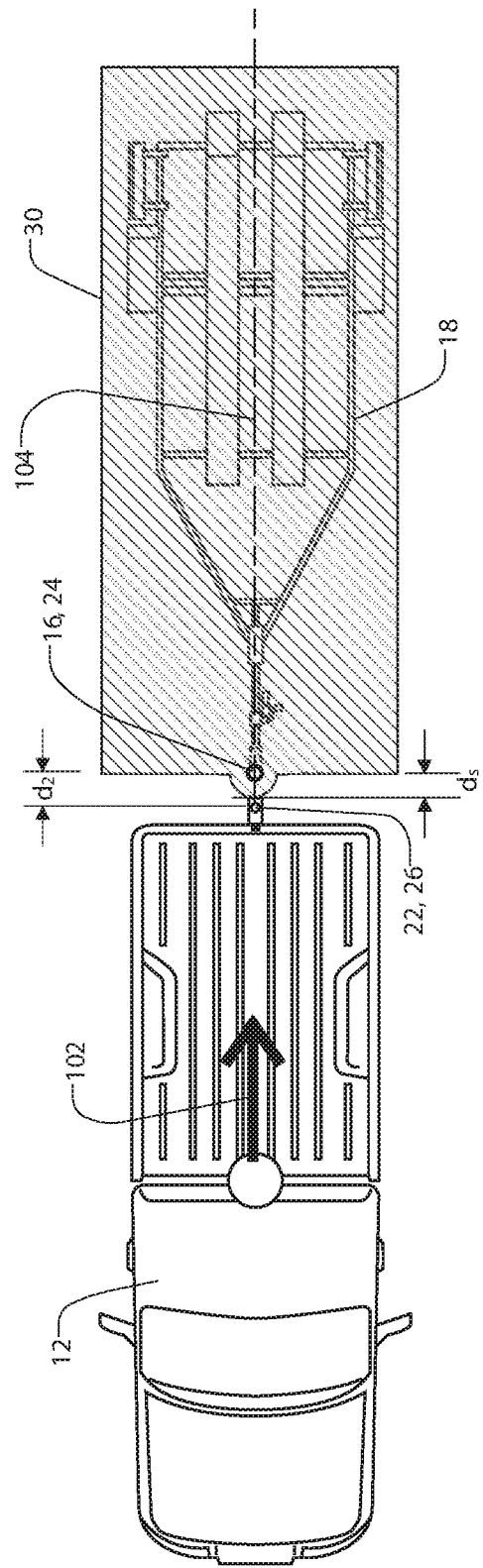

SYSTEM AND METHODS FOR VEHICLE ALIGNMENT CONTROL

FIELD OF THE DISCLOSURE

The present disclosure generally relates to a system for assisting in a vehicle-trailer hitching operation. In particular, the present disclosure relates to a system for controlling an alignment between a vehicle and a coupler of a trailer.

BACKGROUND OF THE DISCLOSURE

Hitching a trailer to a vehicle can be a difficult and time-consuming experience. In particular, aligning a vehicle hitch ball with the desired trailer hitch can, depending on the initial location of the trailer relative to the vehicle, require repeated forward and reverse driving coordinated with multiple steering maneuvers to appropriately position the vehicle. Further, through a significant portion of the driving needed for appropriate hitch ball alignment, the trailer hitch cannot be seen, and the hitch ball can, under ordinary circumstances, never actually be seen by the driver. This lack of sight lines requires an inference of the positioning of the hitch ball and hitch based on experience with a particular vehicle and trailer, and can still require multiple instances of stopping and stepping out of the vehicle to confirm alignment or to note an appropriate correction for a subsequent set of maneuvers. Even further, the closeness of the hitch ball to the rear bumper of the vehicle means that any overshoot can cause a collision of the vehicle with the trailer. Accordingly, further advancements may be desired.

SUMMARY OF THE DISCLOSURE

According to one aspect of the present disclosure, a vehicle system is disclosed. The system comprises a hitch mounted on a vehicle and a controller configured to control a trailer alignment routine. The controller is configured to identify a coupler position of a trailer and control motion of the vehicle toward an aligned position. The controller is further configured to calculate a stopping threshold relative to the coupler position. The stopping threshold comprises a semicircle concentric to the coupler position. The controller is further configured to control a braking procedure in response to the hitch passing the stopping threshold.

Embodiments of the first aspect of the disclosure can include any one or a combination of the following features:
the stopping threshold is identified based on a stopping distance of the vehicle;
the stopping distance defines a radius of the semicircle relative to the coupler position;
the motion of the vehicle is controlled along a heading direction;
the stopping threshold comprises a boundary extending from the semicircle extending around a perimeter of the trailer;
the boundary extends substantially perpendicular to the heading direction through the coupler position;
the controller is further configured to compare a hitch location of the hitch to an alignment region extending about the coupler in response to the vehicle stopping, and, based on the comparison, identify if the hitch location is within the alignment region;
the controller is further configured to output the misalignment signal in response to the hitch location being outside the alignment region;
the stopping distance of the vehicle is calculated based on a velocity of the vehicle;
a level detection device, wherein the level detection device comprises at least one of an inertial measurement unit, a gyroscope, an inclinometer, and an accelerometer;
the controller is further configured to calculate the stopping distance in response to a gradient of a ground surface on which the vehicle is operating identified by the level detection device; and/or
a weight sensor, wherein the controller is further configured to detect the stopping distance of the vehicle based on a mass of the vehicle.

According to another aspect of the present disclosure, a method for controlling a vehicle is disclosed. The method comprises identifying a coupler position of a trailer in the sensor data and controlling motion of the vehicle to an aligned position aligning a hitch ball of the vehicle with the coupler position. The method further comprises calculating a stopping threshold relative to the coupler position. The stopping threshold comprises a coupler boundary extending around the coupler position. The method further comprises controlling a braking procedure in response to the hitch entering the coupler boundary.

Embodiments of the next aspect of the disclosure can include any one or a combination of the following features:
identifying the stopping threshold based on a stopping distance of the vehicle;
the coupler boundary comprises a semicircle extending at the stopping distance about the coupler position;
calculating a trailer boundary based on a heading direction of the vehicle, wherein the trailer boundary extends from the coupler boundary;
wherein controlling the braking procedure further comprises controlling the braking procedure in response to the hitch entering the trailer boundary; and/or
wherein the trailer boundary is calculated to extend substantially perpendicular to a heading direction of the vehicle through the coupler position.

According to another aspect of the present disclosure, a vehicle system configured to control a trailer alignment routine is disclosed. The system comprises a hitch mounted on a vehicle and a sensor configured to capture sensor data in a region proximate to the vehicle. A controller is configured to identify a coupler position of a trailer in the sensor data. The controller is further configured to control the motion of the vehicle along a vehicle heading to an aligned position, wherein the hitch is aligned with the coupler. The controller is further configured to calculate a stopping boundary around at least a portion of the trailer. The stopping boundary comprises a coupler boundary extending at a stopping distance from the coupler and a trailer boundary extending substantially perpendicular to the vehicle heading through the coupler position. In response to the hitch entering the stopping boundary, the controller may control a braking procedure of the vehicle.

These and other aspects, objects, and features of the present disclosure will be understood and appreciated by those skilled in the art upon studying the following specification, claims, and appended drawings.

BRIEF DESCRIPTION OF THE DRAWINGS

In the drawings:

FIG. 5A is a plan view of a vehicle approaching a trailer during an alignment procedure;

FIG. 5B is a plan view of a vehicle approaching a trailer during an alignment procedure;

DETAILED DESCRIPTION OF THE PREFERRED EMBODIMENTS

Figure 1:
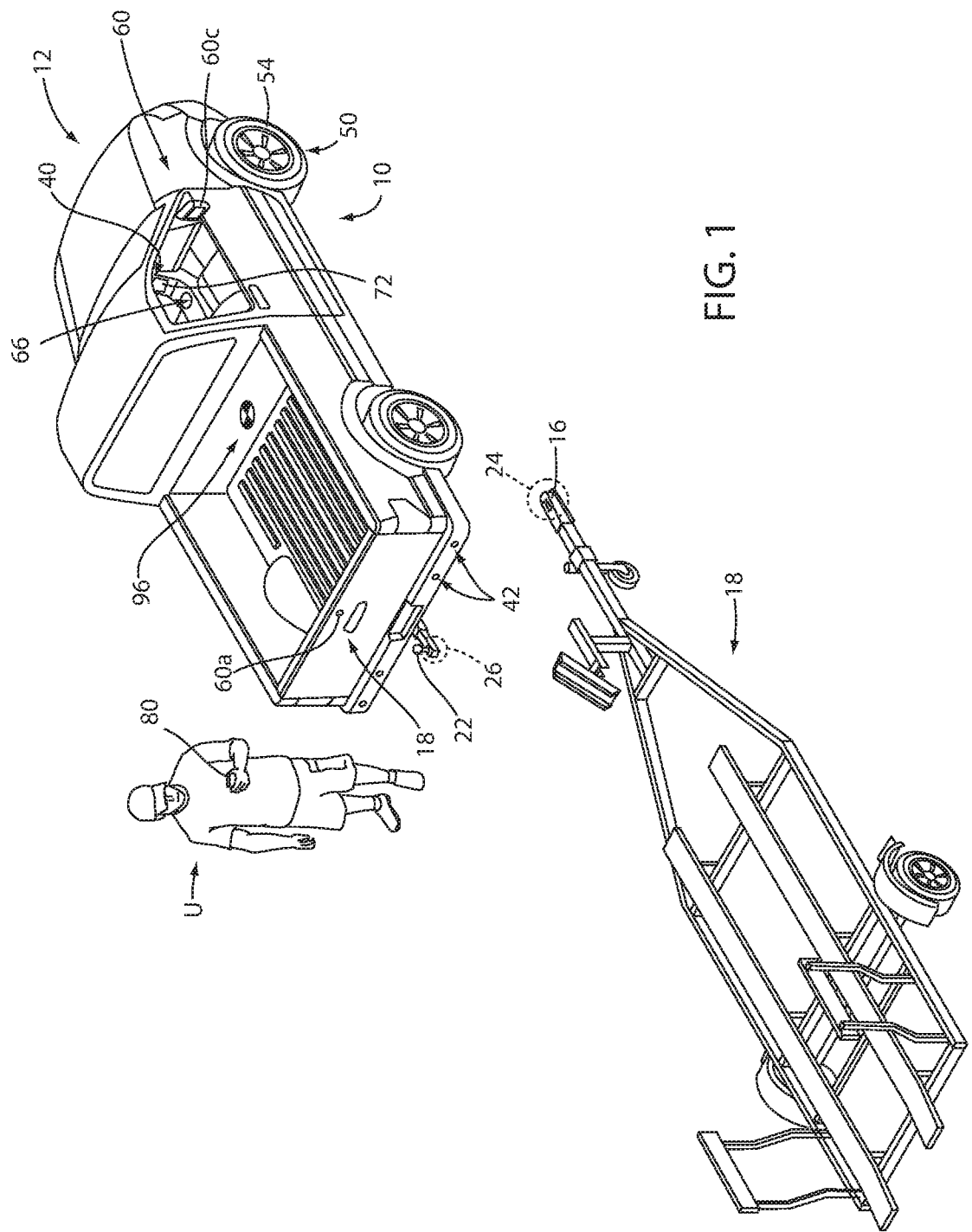
FIG. 1 is a perspective view of a vehicle in an unhitched position relative to a trailer.

For purposes of description herein, the terms "upper," "lower," "right," "left," "rear," "front," "vertical," "horizontal," "interior," "exterior," and derivatives thereof shall relate to the device as oriented in FIG. 1. However, it is to be understood that the device may assume various alternative orientations, except where expressly specified to the contrary. It is also to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise. Additionally, unless otherwise specified, it is to be understood that discussion of a particular feature or component extending in or along a given direction or the like does not mean that the feature or component follows a straight line or axis in such a direction or that it only extends in such direction or on such a plane without other directional components or deviations, unless otherwise specified.

Referring generally to FIGS. 1-4, reference numeral 10 designates a hitch assistance system (also referred to as a "hitch assist" system) for a vehicle 12. In various embodiments, hitch assist system 10 includes a controller 14 configured to acquire position data of a coupler 16 of a trailer 18. The controller 14 may be configured to derive a vehicle path 20 to align a hitch ball 22 of the vehicle 12 with the coupler 16. Deriving the vehicle path 20 may include a variety of steps including detecting and compensating for a change in a coupler position 24 in order to control the vehicle 12 to locate a hitch position 26 aligned with the coupler 16. The vehicle path 20 may comprise a plurality of segments 28, which may correspond to changes in the operating direction or steering direction of the vehicle 12. In various embodiments, deriving the vehicle path 20 may include navigating around intervening objects or structures, operating over uneven terrain, following a desired path indicated by an operator or user U, etc. Accordingly, the disclosure may provide for the hitch assist system 10 to provide for improved navigation of the vehicle 12 and/or interaction with the coupler 16 such that trailer 18 may be effectively connected to the vehicle 12 without complication.

In some embodiments, the system 10 may be configured to identify a stopping threshold based on the position data, which may be derived from one or more sensors in communication with the controller 14. As further discussed in reference to FIGS. 5-7, the stopping threshold may be demonstrated as a boundary region 30. In operation, the controller 14 may be configured to process the positional data or scanning data to define the boundary region 30 extending from various portions of the trailer 18 that may be detected in the scanning data as further discussed herein. The extents or distance that the boundary region 30 is defined relative to the trailer 18 and the coupler 16 may be determined by the controller 14 based on a stopping distance of the vehicle 12. In this configuration, the system 10 may be configured to maneuver the vehicle 12 and control a braking procedure of the vehicle 12 in response to the hitch ball 22 entering the boundary region 30. In this way, the system 10 may be configured to accurately stop the vehicle 12 such that the hitch ball 22 is aligned with the coupler 16.

Figure 2:
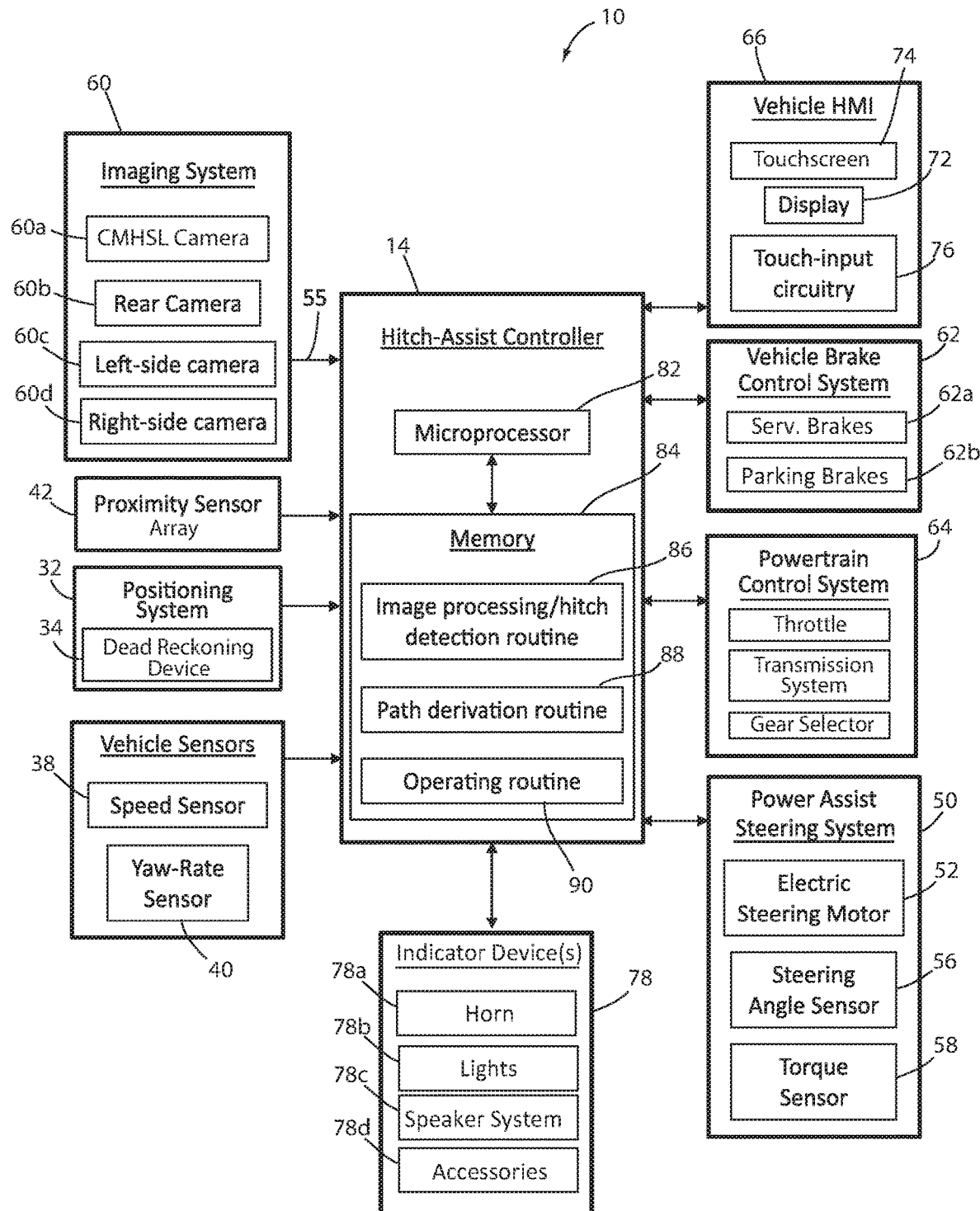
FIG. 2 is a diagram of a system according to an aspect of the disclosure for assisting in aligning the vehicle with a trailer in a position for hitching the trailer to the vehicle.
Figure 3:
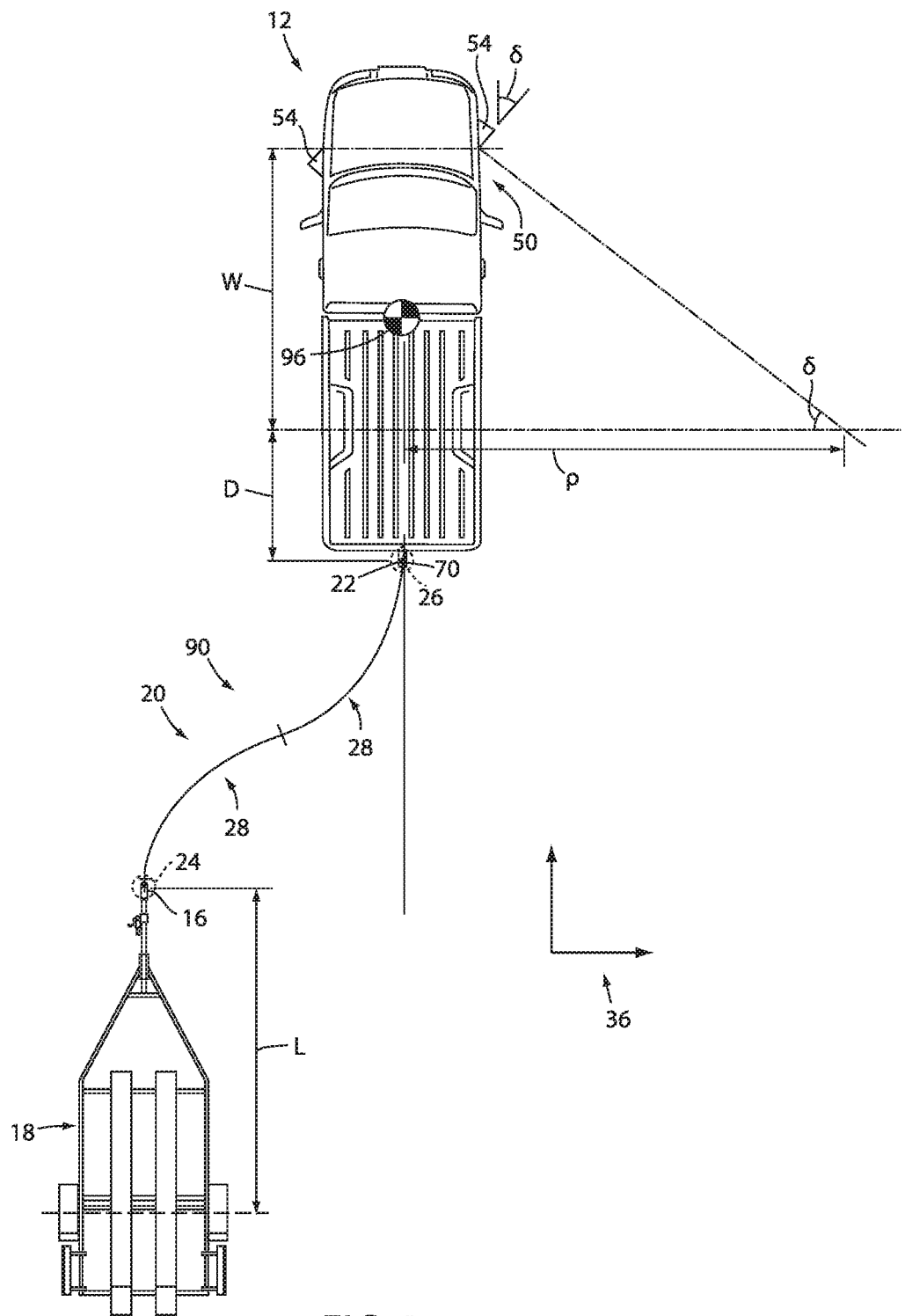
FIG. 3 is a plan view of a vehicle during a step of the alignment sequence with the trailer.
Figure 4:
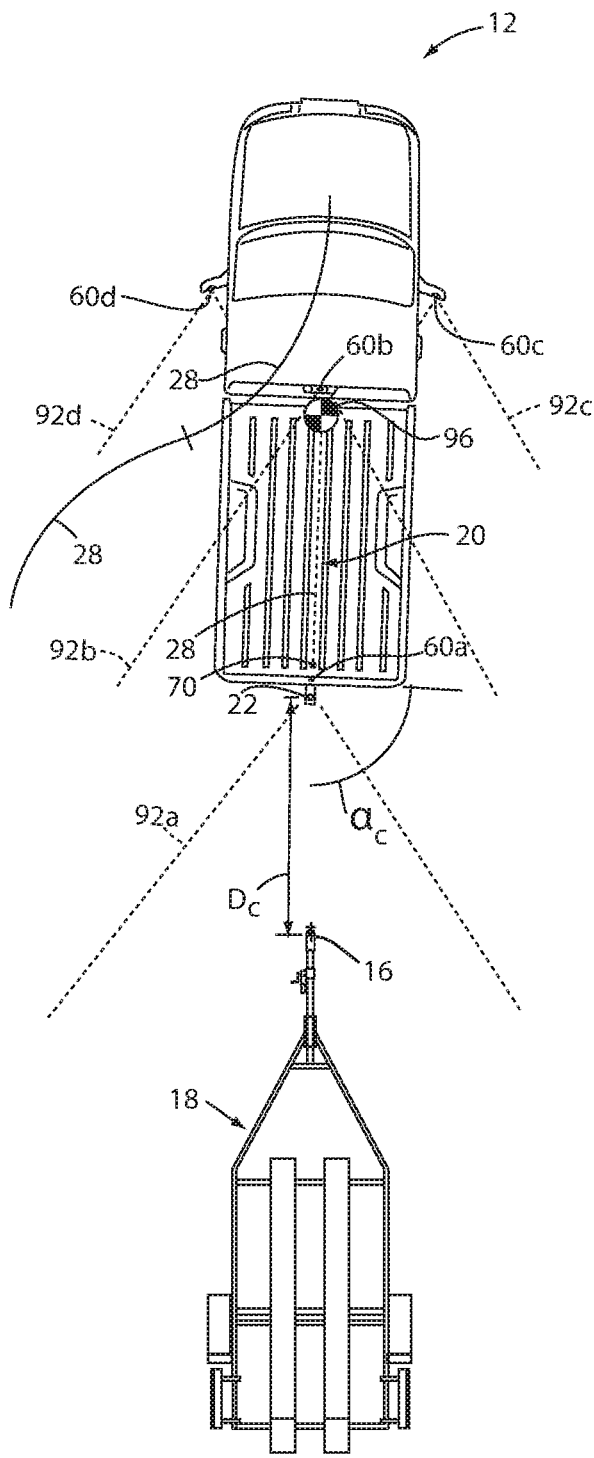
FIG. 4 is a plan view of a vehicle controlling the alignment sequence with the trailer.

With respect to the general operation of the hitch assist system 10, as illustrated in the system diagram of FIGS. 2-4, the system 10 includes various sensors and devices that obtain or otherwise provide vehicle status-related information. This information includes positioning information from a positioning system 32, which may include a dead reckoning device 34 or, in addition or as an alternative, a global positioning system (GPS), to determine a coordinate location of the vehicle 12 based on the one or more locations of the devices within the positioning system 32. In particular, the dead reckoning device 34 can establish and track the coordinate location of the vehicle 12 within a localized coordinate system 36 based at least on vehicle speed and steering angle δ as shown in FIG. 3. Other vehicle information received by hitch assist system 10 may include a speed of the vehicle 12 from a speed sensor 38 and a yaw rate of the vehicle 12 from a yaw rate sensor 40. It is contemplated that in additional embodiments, a proximity sensor 42 or an array thereof, and other vehicle sensors and devices may provide sensor signals or other information, such as sequential images of the trailer 18, including the detected coupler 16, that the controller 14 of the hitch assist system 10 may process with various routines to determine the height H and position (e.g., based on the distance $D_c$ and angle $\alpha_c$) of coupler 16.

As further shown in FIG. 2, one embodiment of the hitch assist system 10 is in communication with the steering system 50 of vehicle 12. The steering system 50 may be a power assist steering system 50 including a steering motor 52 to operate the steered wheels 54 (FIG. 1) of the vehicle 12 for moving the vehicle 12 in such a manner that the vehicle yaw changes with the vehicle velocity and the steering angle δ. In the illustrated embodiment, the power assist steering system 50 is an electric power-assisted steering ("EPAS") system including electric steering motor 52 for turning the steered wheels 54 to a steering angle δ based on a steering command, whereby the steering angle δ may be sensed by a steering angle sensor 56 of the power assist steering system 50. The steering command may be provided by the hitch assist system 10 for autonomously steering during a trailer hitch alignment maneuver and may alternatively be provided manually via a rotational position (e.g., steering wheel angle) of a steering wheel of vehicle 12.

In the illustrated embodiment, the steering wheel of the vehicle 12 is mechanically coupled with the steered wheels 54 of the vehicle 12, such that the steering wheel moves in concert with steered wheels 54, preventing manual intervention with the steering wheel during autonomous steering. More specifically, a torque sensor 58 is provided on the power assist steering system 50 that senses torque on the steering wheel that is not expected from autonomous control of the steering wheel and therefore indicative of manual intervention. In this configuration, the hitch assist system 10 may alert the driver to discontinue manual intervention with the steering wheel and/or discontinue autonomous steering. In alternative embodiments, some vehicles have a power assist steering system 50 that allows a steering wheel to be partially decoupled from movement of the steered wheels 54 of such a vehicle.

With continued reference to FIG. 2, the power assist steering system 50 provides the controller 14 of the hitch assist system 10 with information relating to a rotational position of steered wheels 54 of the vehicle 12, including a steering angle δ. The controller 14 in the illustrated embodiment processes the current steering angle, in addition to various vehicle 12 conditions to guide the vehicle 12 along the desired path 20 (FIG. 3). It is conceivable that the hitch assist system 10, in additional embodiments, may be an integrated component of the power assist steering system 50. For example, the power assist steering system 50 may include a hitch assist algorithm for generating vehicle steering information and commands as a function of all or a portion of information received from an imaging system 60, the power assist steering system 50, a vehicle brake control system 62, a powertrain control system 64, and other vehicle sensors and devices, as well as a human-machine interface ("HMI") 66, as discussed further below.

As also illustrated in FIG. 2, the vehicle brake control system 62 may also communicate with the controller 14 to provide the hitch assist system 10 with braking information, such as vehicle wheel speed, and to receive braking commands from the controller 14. The brake control system 62 may be configured to control service brakes 62a and a parking brake 62b. The parking brake 62b may correspond to an electronic parking brake system that may be in communication with the controller 14. Accordingly, in operation, the controller 14 may be configured to control the brakes 62a and 62b as well as detect vehicle speed information, which may be determined from individual wheel speed sensors monitored by the brake control system 62. Vehicle speed may also be determined from the powertrain control system 64, the speed sensor 38, and/or the positioning system 32, among other conceivable means. In some embodiments, individual wheel speeds can also be used to determine a vehicle yaw rate, which can be provided to the hitch assist system 10 in the alternative or in addition to the vehicle yaw rate sensor 40.

The hitch assist system 10 can further provide vehicle braking information to the brake control system 62 for allowing the hitch assist system 10 to control braking of the vehicle 12 during backing of the trailer 18. For example, the hitch assist system 10, in some embodiments, may regulate speed of the vehicle 12 during alignment of the vehicle 12 with the coupler 16 of trailer 18, which can reduce the potential for a collision with trailer 18, and can bring vehicle 12 to a complete stop at a determined endpoint 70 of the path 20. It is disclosed herein that the hitch assist system 10 can additionally or alternatively issue an alert signal corresponding to a notification of an actual, impending, and/or anticipated collision with a portion of trailer 18. As mentioned above, regulation of the speed of the vehicle 12 may be advantageous to prevent collision with trailer 18.

In some embodiments, the powertrain control system 64, as shown in the embodiment illustrated in FIG. 2, may also interact with the hitch assist system 10 for regulating speed and acceleration of the vehicle 12 during partial or autonomous alignment with trailer 18. During autonomous operation, the powertrain control system 64 may further be utilized and configured to control a throttle as well as a drive gear selection of a transmission of the vehicle 12. Accordingly, in some embodiments, the controller 14 may be configured to control a gear of the transmission system and/or prompt the user U to shift to a desired gear to complete semi-automated operations of the vehicle 12.

As previously discussed, the hitch assist system 10 may communicate with human-machine interface ("HMI") 66 of the vehicle 12. The HMI 66 may include a vehicle display 72, such as a center-stack mounted navigation or entertainment display (FIG. 1). HMI 66 further includes an input device, which can be implemented by configuring display 72 as a portion of a touchscreen 74 with circuitry 76 to receive an input corresponding with a location over display 72. Other forms of input, including one or more joysticks, digital input pads, or the like, can be used in place or in addition to touchscreen 74. Further, the hitch assist system 10 may communicate via wireless communication with another embodiment of the HMI 66, such as with one or more handheld or portable devices 80 (FIG. 1), including one or more smartphones. The portable device 80 may also include the display 72 for displaying one or more images and other information to a user U. For instance, the portable device 80 may display one or more images of the trailer 18 on the display 72 and may be further configured to receive remote user inputs via touchscreen circuitry 76. In addition, the portable device 80 may provide feedback information, such as visual, audible, and tactile alerts.

In some embodiments, the hitch assist system 10 may further be in communication with one or more indicator devices 78. The indicator devices 78 may correspond to conventional vehicle indicators, such as a vehicle horn 78a, lights 78b, a speaker system 78c, vehicle accessories 78d, etc. In some embodiments, the indicator devices 78 may further include one or more accessories 78d, which may correspond to communication devices, remote controls, and a variety of devices that may provide for status and operational feedback between the user U and the vehicle 12. For example, in some embodiments, the HMI 66, the display 72, and the touchscreen 74 may be controlled by the controller 14 to provide status updates identifying the operation or receiving instructions or feedback to control the hitch assist system 10. Additionally, in some embodiments, the portable device 80 may be in communication with the controller 14 and configured to display or otherwise indicate one or more alerts or messages related to the operation of the hitch assist system 10.

Still referring to the embodiment shown in FIG. 2, the controller 14 is configured with a microprocessor 82 to process logic and routines stored in memory 84 that receive information from the above-described sensors and vehicle systems, including the imaging system 60, the power assist steering system 50, the vehicle brake control system 62, the powertrain control system 64, and other vehicle sensors and devices. The controller 14 may generate vehicle steering information and commands as a function of all or a portion of the information received. Thereafter, the vehicle steering information and commands may be provided to the power assist steering system 50 for affecting the steering of the vehicle 12 to achieve a commanded path 20 (FIG. 3) of travel for alignment with the coupler 16 of trailer 18. The controller 14 may include the microprocessor 82 and/or other analog and/or digital circuitry for processing one or more routines. Also, the controller 14 may include the memory 84 for storing one or more routines, including an image processing routine 86 and/or hitch detection routine, a path derivation routine 88, and an operating routine 90.

It should be appreciated that the controller 14 may be a stand-alone dedicated controller or may be a shared controller integrated with other control functions, such as integrated with a vehicle sensor system, the power assist steering system 50, and other conceivable onboard or off-board vehicle control systems. It should further be appreciated that the image processing routine 86 may be carried out by a dedicated processor, for example, within a stand-alone imaging system for vehicle 12 that can output the results of its image processing to other components and systems of vehicle 12, including microprocessor 82. Further, any system, computer, processor, or the like, that completes image processing functionality, such as that described herein, may be referred to herein as an "image processor" regardless of other functionality it may also implement (including simultaneously with executing image processing routine 86).

System 10 may also incorporate the imaging system 60 that includes one or more exterior cameras. Examples of exterior cameras are illustrated in FIG. 4 and include rear camera 60*a*, center high-mount stop light (CHMSL) camera 60*b*, and side-view cameras 60*c* and 60*d*, although other arrangements including additional or alternative cameras are possible. In one example, imaging system 60 can include rear camera 60*a* alone or can be configured such that system 10 utilizes only rear camera 60*a* in a vehicle with multiple exterior cameras. In another example, the various cameras 60*a*-60*d* included in imaging system 60 can be positioned to generally overlap in their respective fields of view, which in the depicted arrangement include fields of view 92*a*, 92*b*, 92*c*, and 92*d* to correspond with rear camera 60*a*, center high-mount stop light (CHMSL) camera 60*b*, and side-view cameras 60*c* and 60*d*, respectively. In this manner, image data from two or more of the cameras can be combined in image processing routine 86, or in another dedicated image processor within imaging system 60, into a single image.

As an example of combining image data from multiple cameras, the image data can be used to derive stereoscopic image data that can be used to reconstruct a three-dimensional scene of the area or areas within overlapped areas of the various fields of view 92*a*, 92*b*, 92*c*, and 92*d*, including any objects (obstacles or coupler 16, for example) therein. In an embodiment, the use of two images including the same object can be used to determine a location of the object relative to the two image sources, given a known spatial relationship between the image sources. In this respect, the image processing routine 86 can use known programming and/or functionality to identify an object within image data from the various cameras 60*a*, 60*b*, 60*c*, and 60*d* within imaging system 60. In either example, the image processing routine 86 can include information related to the positioning of any cameras 60*a*, 60*b*, 60*c*, and 60*d* present on vehicle 12 or utilized by system 10, including relative to a center 96 (FIG. 1) of vehicle 12, for example, such that the positions of cameras 60*a*, 60*b*, 60*c*, and 60*d* relative to center 96 and/or to each other can be used for object positioning calculations and to result in object position data relative to the center 96 of vehicle 12, for example, or other features of vehicle 12, such as hitch ball 22 (FIG. 1), with known positions relative to center 96 of the vehicle 12.

The image processing routine 86 can be specifically programmed or otherwise configured to locate coupler 16 within image data. In one example, the image processing routine 86 can identify the coupler 16 within the image data based on stored or otherwise known visual characteristics of coupler 16 or hitches in general. In another embodiment, a marker in the form of a sticker, or the like, may be affixed with trailer 18 in a specified position relative to coupler 16 in a manner similar to that which is described in commonly-assigned U.S. Pat. No. 9,102,271, the entire disclosure of which is incorporated by reference herein. In such an embodiment, the image processing routine 86 may be programmed with identifying characteristics of the marker for location in image data, as well as the positioning of coupler 16 relative to such a marker so that the position 24 of the coupler 16 can be determined based on the marker location.

Additionally or alternatively, controller 14 may seek confirmation of the determined coupler 16, via a prompt on touchscreen 74. If the coupler 16 determination is not confirmed, further image processing may be provided, or user-adjustment of the position 24 of coupler 16 may be facilitated, either using touchscreen 74 or another input to allow the user U to move the depicted position 24 of coupler 16 on touchscreen 74, which controller 14 uses to adjust the determination of position 24 of coupler 16 with respect to vehicle 12 based on the above-described use of image data. Alternatively, the user U can visually determine the position 24 of coupler 16 within an image presented on HMI 66 and can provide a touch input in a manner similar to that which is described in co-pending, commonly-assigned U.S. Pat. No. 10,266,023, the entire disclosure of which is incorporated by reference herein. The image processing routine 86 can then correlate the location of the touch input with the coordinate system 36 applied to image data shown on the display 72, which may be depicted as shown in FIG. 3.

As shown in FIG. 3, the image processing routine 86 and operating routine 90 may be used in conjunction with each other to determine the path 20 along which hitch assist system 10 can guide vehicle 12 to align hitch ball 22 and coupler 16 of trailer 18. In the example shown, an initial position of vehicle 12 relative to trailer 18 may be such that coupler 16 is only in the field of view 92*c* of side camera 60*c*, with vehicle 12 being positioned laterally from trailer 18 but with coupler 16 being almost longitudinally aligned with hitch ball 22. In this manner, upon initiation of hitch assist system 10, such as by user input on touchscreen 74, for example, image processing routine 86 can identify coupler 16 within the image data of camera 60*c* and estimate the position 24 of coupler 16 relative to hitch ball 22. The position 24 of the coupler 16 may be identified by the system 10 using the image data in accordance by receiving focal length information within image data to determine a distance $D_c$ to coupler 16 and an angle $\alpha_c$ of offset between coupler 16 and the longitudinal axis of vehicle 12. This information may also be used in light of the position 24 of coupler 16 within the field of view of the image data to determine or estimate the height $H_c$ of coupler 16. Once the positioning $D_c$, $\alpha_c$ of coupler 16 has been determined and, optionally, confirmed by the user U, the controller 14 can take control of at least the vehicle steering system 50 to control the movement of vehicle 12 along the desired path 20 to align the hitch ball position 26 of the vehicle hitch ball 22 with coupler 16.

Continuing with reference to FIGS. 3 and 4 with additional reference to FIG. 2, controller 14, having estimated the positioning $D_c$, $\alpha_c$ of coupler 16, as discussed above, can, in one example, execute path derivation routine 88 to determine vehicle path 20 to align the vehicle hitch ball 22 with coupler 16. In particular, controller 14 can have stored in memory 84 various characteristics of vehicle 12, including the wheelbase W, the distance from the rear axle to the hitch ball 22, which is referred to herein as the drawbar length L, as well as the maximum angle to which the steered wheels 54 can be turned $\delta_{max}$. As shown, the wheelbase W and the current steering angle $\delta$ can be used to determine a corresponding turning radius $\rho$ for vehicle 12 according to the equation:

$$\rho = \frac{1}{W \tan \delta} \quad (1)$$

in which the wheelbase W is fixed and the steering angle $\delta$ can be controlled by controller 14 by communication with the steering system 50, as discussed above. In this manner, when the maximum steering angle $\delta_{max}$ is known, the smallest possible value for the turning radius $\rho_{min}$ is determined as:

$$\rho_{min} = \frac{1}{W \tan \delta_{max}} \quad (2)$$

Path derivation routine 88 can be programmed to derive vehicle path 20 to align a known location of the vehicle hitch ball 22 with the estimated position 24 of coupler 16 that takes into account the determined minimum turning radius $\rho_{min}$ to allow path 20 to use the minimum amount of space and maneuvers. In this manner, path derivation routine 88 can use the position of vehicle 12, which can be based on the center 96 of vehicle 12, a location along the rear axle, the location of the dead reckoning device 34, or another known location on the coordinate system 36, to determine both a lateral distance to the coupler 16 and a forward or rearward distance to coupler 16 and derive a path 20 that achieves the needed lateral and forward-backward movement of vehicle 12 within the limitations of steering system 50. The derivation of path 20 further takes into account the positioning of hitch ball 22, based on length L, relative to the tracked location of vehicle 12 (which may correspond with the center 96 of mass of vehicle 12, the location of a GPS receiver, or another specified, known area) to determine the needed positioning of vehicle 12 to align hitch ball 22 with coupler 16.

Referring now to FIGS. 5A and 5B, top plan views of the vehicle 12 are shown demonstrating a guidance routine configured to align the hitch ball 22 with coupler 16. As illustrated, the controller 14 may be configured to maneuver the vehicle 12 in reverse along a heading direction 102, which may be identified based on the path 20 determined via the path derivation routine 88. As previously discussed, the controller 14 may be configured to control the brake control system 62 to control the approach of the vehicle 12 at the endpoint 70 of the path 20. In order to ensure that the vehicle 12 is accurately stopped at the endpoint 70, the controller 14 may further determine the boundary region 30 based on the stopping distance of the vehicle 12. In this way, the system 10 may control the vehicle 12 to accurately align the hitch ball 22 with the coupler 16 in a variety of approach angles while preventing a collision between the vehicle 12 and the trailer 18.

In FIG. 5A, the vehicle 12 is shown at a first distance $d_1$, and, in FIG. 5B, the vehicle 12 is shown at a second distance $d_2$ relative to the coupler position 24. As the vehicle 12 approaches the trailer 18, the controller 14 may decrease the vehicle speed to an approach speed. The approach speed of the vehicle 12 may provide for a stopping distance $d_s$ of the vehicle to be consistently controlled by the system. For example, the stopping distance $d_s$ of the vehicle 12 may be calculated based on various control parameters of the brake control system 62 and/or calibrated by sample data captured by the system 10 during one or more trial measurements. The calculation of the stopping distance $d_s$ may be calculated as a function of the velocity of the vehicle 12, the performance of the brake system 62, a surface gradient or angle of the surface on which the vehicle 12 is operating and the mass of the vehicle 12. In order to provide for the surface gradient, the controller 14 may be in communication with an inertial measurement unit (IMU), a gyroscope, an inclinometer, and/or an accelerometer. Additionally, the mass of the vehicle 12 may be measured by one or more weight sensors or pressure sensors in communication with the controller 14. In this way, the system 10 may be configured to calculate and/or determine the stopping distance $d_s$.

In some embodiments, the stopping distance $d_s$ may be calibrated based on a desired deceleration rate of the vehicle 12. The calibration may be based on the surface gradient, the mass of the vehicle 12, etc. as previously discussed. Additionally, the stopping distance $d_s$ may be adjusted and calibrated to suit a comfort condition or desired time required to complete an alignment routine. For example, an increased deceleration rate may reduce comfort, but may improve a time necessary to complete the alignment routine by allowing for increased operating speeds and/or a reduced stopping distance $d_s$. In contrast, a low deceleration rate may result in a smoother stoppage of the vehicle 12 but may ether increase an alignment time or increase the stopping distance $d_s$. Accordingly, the operation of the system 10 may be calibrated to suit a desired rate of deceleration and additional variable that may be associated with the rate of deceleration as discussed herein.

Based on the stopping distance $d_s$, the controller 14 may calculate the boundary region 30 extending from a perimeter 106 of the trailer 18. The perimeter 106 of the trailer 18 may be detected in the scanning data as a perimeter edge of the trailer 18 is identified in image data and/or proximity data captured by the imaging system 60 or various additional scanning devices (e.g. ultrasonic sensors, radar sensors, etc.). In some embodiments, the controller 14 may calculate a coupler boundary 30a based on the perimeter 106 of the coupler 16. The coupler boundary 30a which may correspond to a semicircle positioned concentrically about the coupler position 24. Additionally, the boundary region 30 may comprise a trailer boundary 30b, which may extend substantially perpendicular to the heading direction 102 through the coupler position 24. In this way, the boundary region 30 may vary based on an approach angle between the heading direction 102 of the vehicle 12 and a coupler trajectory 104, which may be substantially aligned with a centerline C of the trailer 18. The adjustment of the boundary region 30 is further discussed in reference to FIG. 6.

Referring still to FIGS. 5A and 5B, in response to a portion of the vehicle 12 entering or crossing a threshold of the boundary region 30, the controller 14 may control the brake system 62 to stop the vehicle 12. As shown in FIG. 5B, the controller 14 may activate the braking routine in response to the hitch ball 22 entering the boundary region 30 such that the vehicle 12 is accurately stopped with that the hitch ball 22 is aligned with the coupler 16. In order to provide for the alignment as shown in FIGS. 5A and 5B, the controller 14 may calculate the path derivation routine 88 such that the heading direction 102 of the vehicle 12 and a coupler trajectory 104 are substantially aligned with a centerline C when the vehicle 12 enters the boundary region 30.

Figure 6:
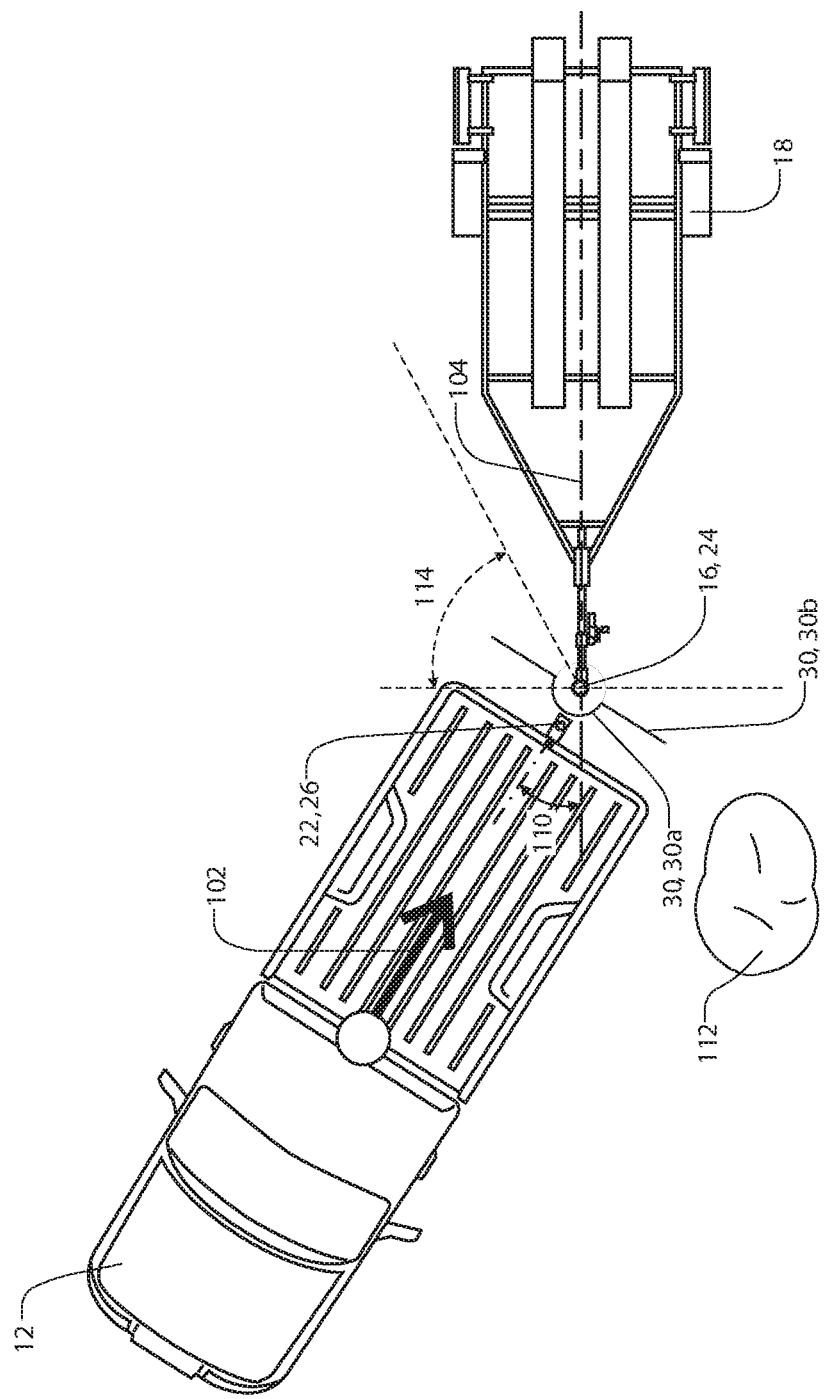
FIG. 6 is a plan view of a vehicle approaching a trailer during an alignment procedure demonstrating an obstruction.

Referring now to FIG. 6, the vehicle 12 is shown approaching the trailer 18 along an approach angle 110.

Though in many cases, aligning the heading direction 102 with the coupler trajectory 104 as shown in FIGS. 5A and 5B may be favorable, in many situations, the alignment of the approach angle 110 may be problematic or impossible. For example, if the system 10 is only configured to operate or maneuver the vehicle 12 in the reverse direction, a requirement of aligning the heading direction 102 with the coupler trajectory 104 may result in limited operating conditions of the system 10 due the navigational limitations related to the dynamics (e.g. minimum turning radius $\rho_{min}$) of the vehicle 12. Additionally, in some scenarios, the alignment of the heading direction 102 with the coupler trajectory 104 will be limited due to the presence of one or more objects 112 that may obstruct the path 20 of the vehicle 12. In such situations, the controller 14 may be configured to maneuver the vehicle 12 such that the approach angle is less than a critical angle 114, which may be dependent on the dimensions or proportion of the trailer 18, the coupler 16, the hitch ball 22 and corresponding hitch mount, etc. The critical angle 114 may be programmed by the user U and or detected from the image data as discussed herein.

In operation, the critical angle 114 may be compared with the boundary region 30 to determine an alignment feasibility of aligning the hitch ball 22 with the coupler 16. For example, if a portion of the trailer boundary 30b or the hitch boundary 30a intersect with or cross the critical angle 114, the controller 14 may cancel an alignment routine. Additionally, if any portion of the vehicle 12 enters or crosses a threshold of the boundary region 30, the controller 14 may control the brake system 62 to stop the vehicle 12. In this way, the controller 14 may be configured to determine the alignment feasibility of the hitch ball 22 with the coupler 16 and trigger a stopping action of the brake system to align the hitch ball 22 with the coupler 16 based on the boundary region 30. In this way, the disclosure may provide for robust operation of the vehicle 12 to align the hitch ball 22 with the coupler 16 for connection.

Figure 7:
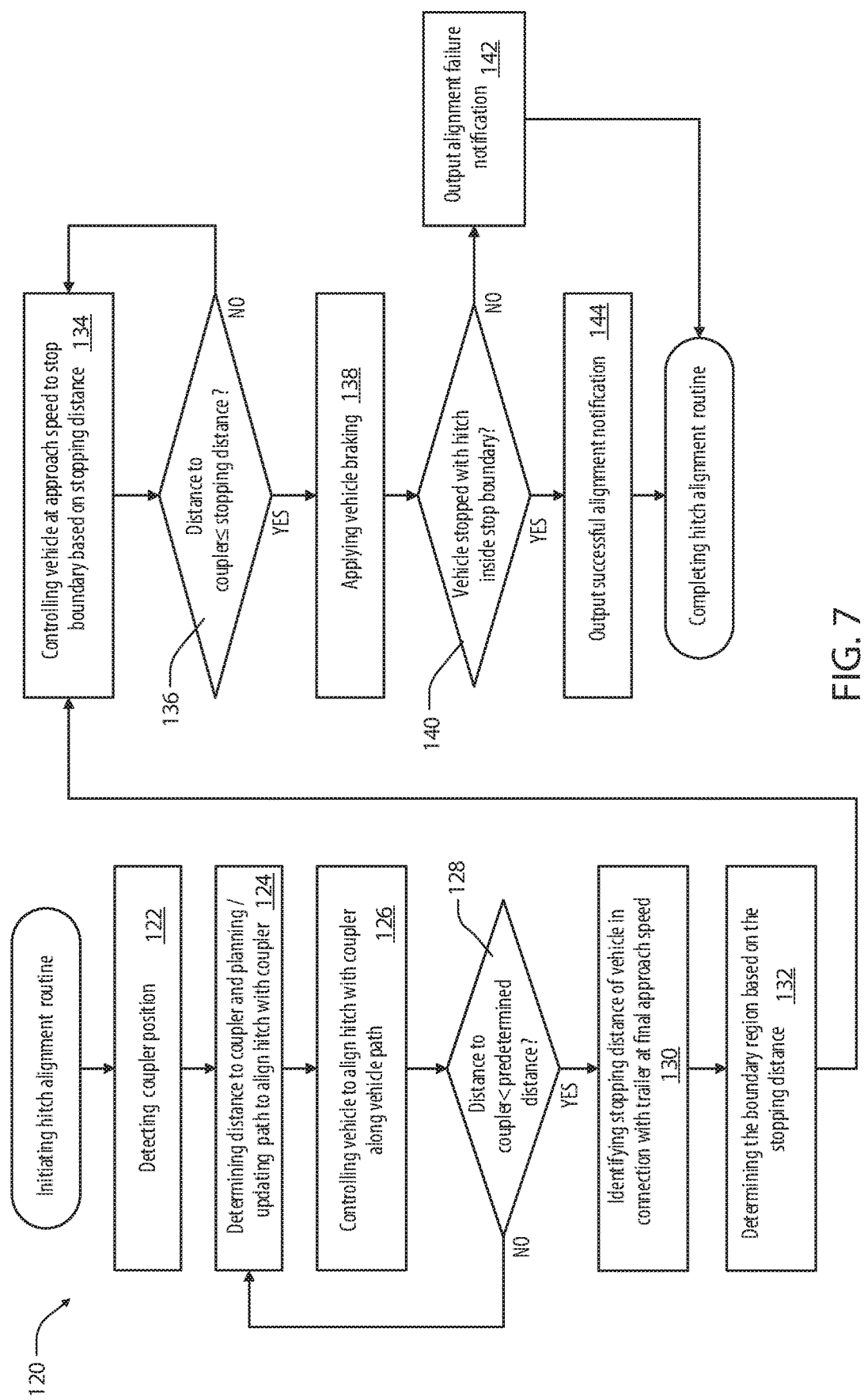
FIG. 7 is a flow chart demonstrating a method for controlling an alignment between a vehicle hitch and a coupler of a trailer in accordance with the disclosure.

Referring now to FIG. 7, a flow chart demonstrating an alignment routine 120 is shown in accordance with the disclosure. In operation, the controller 14 may begin the routine 120 by detecting the coupler position 24 of the coupler 16 in connection with the trailer 18 (122). Once the coupler position 24 is determined, the controller 14 may continue to identify the path 20 of the vehicle 12 based on the path derivation routine 88 (124). Once the path is identified, the controller 14 may control the system 10 to maneuver the vehicle 12 along the path 20 (126). While maneuvering the vehicle 12, the controller 14 may monitor the distance of the coupler position 24 along the path 20 (128). If the distance is greater than an approach distance (e.g. a predetermined distance), the controller 14 may return to step 124. If the distance is less than the approach distance, the controller 14 may identify the stopping distance $d_s$ of the vehicle 12 based on the approach speed, load, and additional operating parameters as discussed herein (130).

Based on the stopping distance $d_s$, the controller 14 may further define the boundary region 30 (132). Once the boundary region 30 is determined, the controller 14 may continue to maneuver the vehicle 12 along the path 20 at the approach speed (134). Additionally, the controller 14 may continue monitoring the distance to the coupler position 24 along the path 20 to determine if a portion (e.g. the hitch ball 22) of the vehicle 12 has entered or crossed a threshold of the boundary region 30 (136). If the vehicle 12 has entered the hitch boundary 30, the controller 14 may control the brake control system 62 to stop the vehicle 12 (138). If the vehicle 12 has not entered the hitch boundary 30, the controller 14 may continue to control the vehicle 12 along the path 20 at the approach speed (134).

After the vehicle 12 has stopped, the controller 14 may determine if the hitch position 26 is aligned with the coupler position 24 (140). The determination of the alignment of the hitch position 26 with the coupler position 24 may be determined based on the image data captured via the imaging system 60. If the hitch position 26 is not aligned with the coupler position 24, the controller 14 may output an alignment failure indication or notification (142). If the hitch position 26 is aligned with the coupler position 24 in step 140, the controller 14 may output an alignment success indication (144). Following either of steps 142 and 144, the controller 14 may complete the alignment routine 120. In this way, based on the determination of the boundary region 30, the controller 14 may accurately stop the vehicle 12 with the hitch ball 22 aligned with the coupler 16.

The specific detailed steps discussed in reference to the various embodiments and methods described herein are examples provided to demonstrate some useful applications of the systems and devices disclosed by the application. It shall be understood that though specific devices are discussed in reference to the system 10, various devices that may provide similar operational characteristics may be implemented to provide the methods discussed herein. Accordingly, the detailed embodiments provided herein shall not be considered limiting to the scope of the disclosure.

It is to be understood that variations and modifications can be made on the aforementioned structure without departing from the concepts of the present disclosure, and further it is to be understood that such concepts are intended to be covered by the following claims unless these claims by their language expressly state otherwise.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A vehicle system configured to control a trailer alignment routine, comprising:
   a hitch mounted on a vehicle; and
   a controller that:
      identifies a coupler position of a trailer;
      controls motion of the vehicle to toward an aligned position;
      calculates a stopping threshold identified based on a stopping distance of the vehicle relative to the coupler position, wherein the stopping threshold comprises a semicircle concentric to the coupler position and the stopping distance defines a radius of the semicircle relative to the coupler position; and
      controls a braking procedure in response to the hitch passing the stopping threshold.

2. The system according to claim 1, wherein the motion of the vehicle is controlled along a heading direction.

3. The system according to claim 2, wherein the stopping threshold comprises a boundary extending from the semicircle extending around a perimeter of the trailer.

4. The system according to claim 3, wherein the boundary extends substantially perpendicular to the heading direction through the coupler position.

5. The system according to claim 1, wherein the controllers further:
   compares a hitch location of the hitch to an alignment region extending about the coupler in response to the vehicle stopping; and
   based on the comparison, identifies if the hitch location is within the alignment region.

6. The system according to claim 5, wherein the controller further:
   outputs a misalignment signal in response to the hitch location being outside the alignment region.

7. The system according to claim 1, wherein the stopping distance of the vehicle is calculated based on a velocity of the vehicle.

8. The system according to claim 7, further comprising a level detection device.

9. The system according to claim 8, wherein the level detection device comprises at least one of an inertial measurement unit, a gyroscope, an inclinometer, and an accelerometer.

10. The system according to claim 8, wherein the controller further calculates the stopping distance in response to a gradient of a ground surface on which the vehicle is operating identified by the level detection device.

11. The system according to claim 7, further comprising a weight sensor, wherein the controller further detects the stopping distance of the vehicle based on a mass of the vehicle.

12. A method for controlling a vehicle comprising:
   identifying a coupler position of a trailer in the sensor data;
   controlling motion of the vehicle to an aligned position aligning a hitch ball of the vehicle with the coupler position;
   calculating a stopping threshold based on a stopping distance of the vehicle relative to the coupler position, wherein the stopping threshold comprises a coupler boundary extending around the coupler position and the coupler boundary comprises a semicircle extending at the stopping distance about the coupler position; and
   controlling a braking procedure in response to the hitch entering the coupler boundary.

13. The method according to 12, further comprising
   calculating a trailer boundary based on a heading direction of the vehicle, wherein the trailer boundary extends from the coupler boundary.

14. The method according to claim 13, wherein controlling the braking procedure further comprises controlling the braking procedure in response to the hitch entering the trailer boundary.

15. The method according to claim 13, wherein the trailer boundary is calculated to extend substantially perpendicular to a heading direction of the vehicle through the coupler position.

16. A vehicle system configured to control a trailer alignment routine, comprising:
   a hitch mounted on a vehicle;
   a sensor configured to capture sensor data in a region proximate to the vehicle; and
   a controller that:
      identifies a coupler position of a trailer in the sensor data;
      controls motion of the vehicle along a vehicle heading to an aligned position, wherein the hitch is aligned with the coupler;
      calculates a stopping boundary around at least a portion of the trailer, wherein the stopping boundary comprises a coupler boundary extending at a stopping distance from the coupler and a trailer boundary extending substantially perpendicular to the vehicle heading through the coupler position; and
      controls a braking procedure in response to the hitch entering the stopping boundary.

* * * * *